Patented Feb. 26, 1952

2,586,844

UNITED STATES PATENT OFFICE 2,586,844

PREPARATION OF Δ²-1,3-DIAZACYCLO-ALKENES

Arthur F. McKay, Kingston, Ontario, and Gordon A. Grant, Montreal, Quebec, Canada, assignors to Ayerst, McKenna & Harrison, Limited, Montreal, Quebec, Canada, a corporation of Canada No Drawing. Application March 2, 1948, Serial No. 12,694. In Canada October 21, 1947

4 Claims. (Cl. 260—265.4)

The present invention relates to the preparation of new secondary amines, more particularly 2-amino-substituted Δ²-1,3-diazacycloalkenes.

The compounds according to the present invention are 2-amino-substituted Δ²-1,3-diazacycloalkenes in which at least one of the hydrogens in at least one of the methylene groups may be substituted by hydroxyl, halogen, or an organic radical such as alkyl, alkoxy, aryl, or aralkyl. These compounds may be represented by the following formula

wherein X is the Δ²-1,3-diazacycloalkene nucleus and R is an organic radical, preferably a straight or branched chain alkyl containing 2 or more carbon atoms, a straight or branched chain aralkyl, alkoxy aralkyl, or

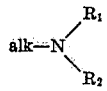

wherein alk is a straight or branched chain alkyl and R₁ and R₂ each stand for hydrogen or alkyl, or where R₁ or R₂ can be Δ²-1,3-diazacycloalkyl and the other radical hydrogen or alkyl.

These compounds, we have found, may be prepared by reacting 2-nitramino-Δ²-1,3-diazacycloalkenes with appropriate organic amines, preferably those of the formula R—NH₂ wherein R is as defined above. These new compounds are useful for a variety of purposes, for example, as intermediates in the synthesis of medicinal compounds.

The starting 2-nitramino-Δ²-1,3-diazacycloalkenes are prepared in accordance with co-pending application Serial No. 776,418, filed September 26, 1947, now Patent No. 2,525,927, by reacting directly an appropriate alkylene diamine with nitroguanidine, and preferably by reacting a di-acid salt of an appropriate alkylene diamine with an alkali metal salt of nitroguanidine. By this reference, the disclosure of co-pending application Serial No. 776,418 is hereby incorporated into the present application.

In accordance with the present invention, the 2-nitramino-Δ²-1,3-diazacycloalkene is reacted with the organic amine by bringing the materials together and heating to a reaction temperature, usually above about 45° C., preferably up to about 200° C. The reaction is generally carried out in the absence of a solvent, although, in the case of the 5 membered ring compound it is preferable to employ an inert solvent, for example an aromatic hydrocarbon, for example benzene, toluene or xylene. From the reaction mixture the desired 2-amino-substituted-Δ²-1,3-diazacycloalkene is isolated, for example, by fractional distillation.

It has been found that the nitramino compounds react with surprising ease with the amines to form the desired 2-amino-substituted-Δ²-1,3-diazacycloalkene.

The end products are themselves useful as therapeutically active substances and are also useful as intermediates in the synthesis of therapeutically active substances.

The following are examples of compounds according to the present invention. It will be noted that in some there is no substitution in any methylene group and in others some or all of the methylene groups are substituted.

EXAMPLE 1

2-isobutylamino-Δ²-imidazoline

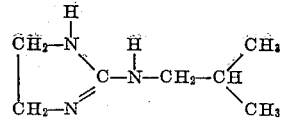

To a solution of 21.9 parts of isobutylamine in 20 parts of xylene, 13 parts by weight of 2-nitramino-Δ²-imidazoline were added. As soon as the mixture was heated, a reaction commenced and gas was evolved. The mixture was heated at reflux temperature for a period of one hour after which gassing had ceased and all of the 2-nitramino-Δ²-imidazoline had reacted. The reaction mixture was fractionally distilled. The first fraction distilling below 167° C. at atmospheric pressure consisted of excess iso-butylamine, xylene and water formed during the reaction. Crystals had just started to form on the side arm of the distillation flask. The residue (96 percent yield) was a reddish crystalline solid which distilled over at 144° C. (0.5 mm. Hg pressure) as a colorless oil. The colorless oil soon changed into a white crystalline solid. The picrate of this material melted at 181-182° C. and gave the correct analysis for the monopicrate salt of 2-isobutylamino-Δ²-imidazoline.

EXAMPLE 2

4(5)-methyl-2-isobutylamino-Δ²-imidazoline

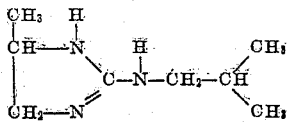

A reaction mixture of 7.2 parts of 4(5)-methyl-2-nitramino-$\Delta^2$-imidazoline, 10.9 parts of isobutylamine, and 20 parts of xylene was heated at reflux temperature for forty-five minutes. After approximately twenty minutes of refluxing, all of the 4(5)-methyl-2-nitramino-$\Delta^2$-imidazoline had dissolved. The product was recovered by fractional distillation of the reaction mixture. Distillation at atmospheric pressure below a temperature of 160° C. removed the excess isobutylamine, the xylene and the water leaving a crystalline residue, yield 99%. The crystalline residue distilled at 132–134° C. in vacuo (0.09 mm. Hg); the distillate was a white crystalline solid which turned pink on exposure to air. The material was hygroscopic and formed a crystalline picrate. The picrate after recrystallization from water melted at 137–138.5° C. and gave analytical values in good agreement with those required for the monopicrate salt of 4(5) methyl-2-isobutylamino-$\Delta^2$-imidazoline.

EXAMPLE 3

2-(3-diethylaminopropylamino)-$\Delta^2$-1,3-diazacyclopentene

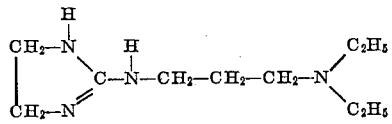

To forty-five parts by weight of 3-diethylaminopropylamine dissolved in 40 parts of xylene were added 15 parts of 2-nitramino-$\Delta^2$-1,3-diazacyclopentene. This reaction mixture was refluxed for a period of thirty minutes after which the xylene and excess 3-diethylaminopropylamine were removed by distillation at atmospheric pressure. The residual product (14.1 parts by weight 62% by theory) distilled at ca. 0.1 mm. Hg pressure at a temperature of 152–157° C. The picrate melted at 83–84.5° C. and gave analysis in good agreement for the picrate of 2-(3-diethylaminopropylamino)-$\Delta^2$-1,3-diazacyclopentene.

EXAMPLE 4

2-benzylamino-$\Delta^2$-1,3-diazacyclohexene

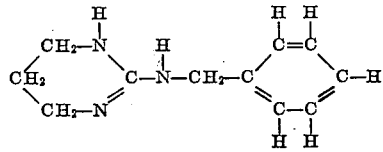

In the preparation of the secondary amines containing a six membered ring heterocyclic, the reaction is carried out in a distillation set-up and the water is removed as formed along with some of the excess amine. This precaution is taken to minimize the formation of 1,3-diazacyclohexanone-2 which decreases the yield of the desired secondary amine. 16.1 parts of 2-nitramino-$\Delta^2$-1,3-diazacyclohexene were placed in the distillation pot together with 52.8 parts by weight of benzyl amine. The reaction mixture was heated at such a rate that a slow distillation of benzylamine occurred along with water formed in the reaction. After the reaction had ceased the excess benzylamine was removed by continuing the distillation. The residue (18.2 g.; 86.5% yield) was pale yellow in color. It was distilled in vacuo (0.1 mm. Hg) at 165–172° C. to give a pale yellow oil which crystallized immediately. The picrate of this product melted at 159–159.5° C. and gave analytical values in agreement with those required for the monopicrate of 2-benzylamino-$\Delta^2$-1,3-diazacyclohexene.

EXAMPLE 5

2-($\beta$-phenylethylamino-)-4(6)-methyl $\Delta^2$-1,3-diazacyclohexene

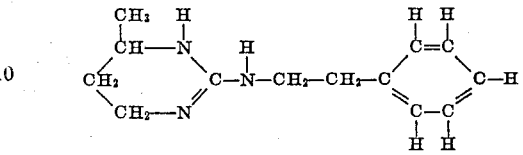

Twenty-six parts by weight of 4(6)-methyl-2-nitramino-$\Delta^2$-tetrahydropyrimidine are mixed with 80.0 parts of $\beta$-phenylethylamine and the mixture was heated rapidly until the $\beta$-phenylethylamine began to distil. 50 cc. of the original 89 cc. was collected. The residue, a clear yellow oil, was distilled in vacuum. After removal of a slight amount of crystalline material, the yield of the product was 81% by theory. The picrate melted at 176.5–177.5° C.

EXAMPLE 6

2-benzylamino-4(6)-methyl-$\Delta^2$-1,3-diazacyclohexene

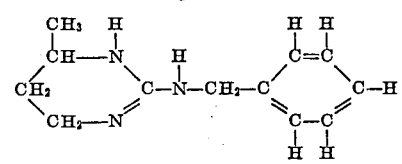

When 24 parts by weight of 4(6)-methyl-2-nitramino-$\Delta^2$-1,3-diazacyclohexene were reacted with 82.2 parts of benzylamine under the conditions described in Example 4, an 86% yield by theory of 2-benzylamino-4(6)-methyl-$\Delta^2$-1,3-diazacyclohexene was obtained. It distilled over at 172–175° C. under a pressure of ca. 0.1 mm. Hg. The picrate melted at 128–128.5° C. and analyzed for the monopicrate of the above compound.

EXAMPLE 7

2-($\beta$-phenylethylamino)-$\Delta^2$-tetrahydropyrimidine

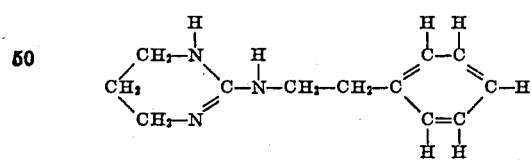

One part of 2-nitramino-$\Delta^2$-1,3-diazacyclohexene was added to 10 parts of $\beta$-phenylethylamine and the excess $\beta$-phenylethylamine was distilled over slowly during the course of the reaction. Finally when all signs of reaction were absent, the last traces of $\beta$-phenylethylamine were removed by distillation. The residual oil on distillation in vacuo gave a crystalline distillate, yield 89%. The picrate of the product melted at 198.5–199.5° C. and gave analysis in good agreement with the monopicrate of 2-($\beta$-phenylethylamino)-$\Delta^2$-tetrahydropyrimidine.

EXAMPLE 8

2-amylamino-$\Delta^2$-imidazoline

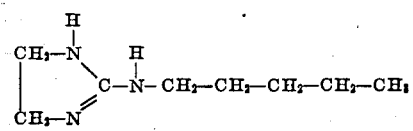

A mixture of 10 parts of 2-nitramino-Δ²-imidazoline, 20 parts of n-amylamine, and 30 parts of xylene was heated so that slow distillation was maintained. The distillation was continued until the vapor pressure rose to the boiling point of xylene. Then the residue was transferred to a high vacuum distillation apparatus. After all the xylene had distilled, the distillation was continued at a pressure of ca. 0.1 mm. Hg. A water-white oil distilled over at a temperature of 158° C. which went completely crystalline on cooling, yield 96% of theory. The picrate melts at 154–155.5° C.

EXAMPLE 9

4(5)-methyl-2-amylamino-Δ²-imidazoline

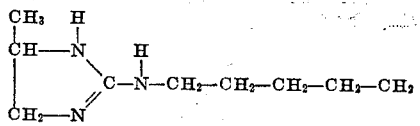

Fourteen and four-tenths parts of 4(5)-methyl-2-nitramino-Δ²-imidazoline and 26.1 parts of n-amylamine were mixed with 30 parts of xylene in an ordinary distillation set-up. The reaction mixture was distilled slowly until the vapor temperature reached 140° C.

The residue was then transferred to a Claisen flask and distilled under reduced pressure. The product was a pale yellow oil, yield 98% by theory.

EXAMPLE 10

4(5)-methyl-2-butylamino-Δ²-imidazoline

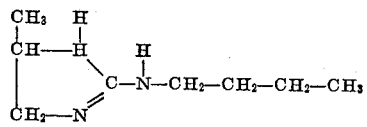

A mixture of 14.4 parts of 4(5)-methyl-2-nitramino-Δ²-imidazoline, 21.9 parts of n-butylamine and 30 parts of xylene were placed in an ordinary distillation apparatus. Then the distillation was continued slowly until the vapor temperature reached 140° C. The residue on distillation gave the desired product as a yellow oil, in 94.5% yield.

EXAMPLE 11

2-butylamino-Δ²-imidazoline

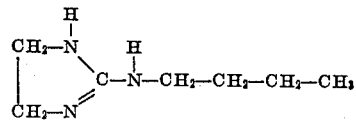

Six and six tenths parts of 2-nitramino-Δ²-imidazoline were mixed with 30 parts of xylene and 28 parts of n-butylamine in a distillation flask and distilled slowly until the vapor temperature of the distillate reached approximately 140° C. The residue was distilled at reduced pressure, the secondary amine coming over as a water-white oil which crystallized on standing, yield 97.7% theory. The picrate prepared in the usual manner melted at 173–174° C. after purification.

EXAMPLE 12

2-benzylamino-5-hydroxy-Δ²-tetrahydropyrimidine

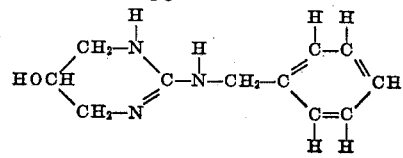

A sludge consisting of 8 parts of 5-hydroxy-2-nitramino-Δ²-tetrahydropyrimidine and 10 parts of benzylamine was added dropwise to 20 parts of benzylamine while a slow rate of distillation was maintained. After addition was complete, the hot residue was transferred to a beaker and 30 parts of ether were added. The white solid product was filtered off and washed with ether, yield 68.5% by theory.

EXAMPLE 13

2-(β-aminoethylamino)-Δ²-imidazoline

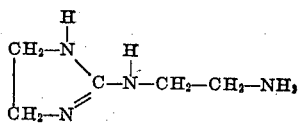

To the hot (90° C.) ethylene diamine monohydrate (30 parts), 6.5 parts by weight of 2-nitramino-Δ²-imidazoline were added portionwise. After the completion of the addition, which required approximately ten minutes, the excess ethylene diamine was removed by distillation. The residue was fractionally distilled in vacuo to give a 62% yield of 2-(β-aminoethylamino)-Δ²-imidazoline. The picrate melted at 199–200° C. and gave analytical values in agreement with the dipicrate of 2(β-aminoethylamine)-Δ²-imidazoline.

EXAMPLE 14

N,N¹-2-[4(5)-methyl-Δ²-imidazoline]-ethylenediamine

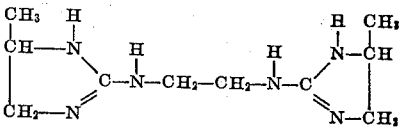

Forty parts by weight of 4(5)-methyl-2-nitramino-Δ²-imidazoline were added to 200 parts of hot (80–90° C.) ethylenediamine monohydrate. After addition of the nitramino compound, which required about three quarters of an hour, the excess ethylenediamine was removed by distillation. The residue was fractionated in vacuo. The first fraction B. P. 184–187° C./0.04–0.06 mm. Hg was obtained in 72% yield based on the formation of 2-(β-aminoethylamino)-4(5)-methyl-Δ²-imidazoline. The dipicrate of this fraction melted at 200–201° C. Another fraction was obtained which distilled over at 250–260° C. The dipicrate of this latter fraction gave analysis in good agreement with the values required for N,N¹-2-[4(5)-methyl-Δ²-imidazoline]-ethylenediamine.

EXAMPLE 15

2-(3-dimethylaminopropylamino)-Δ²-1,3-diazacyclopentene

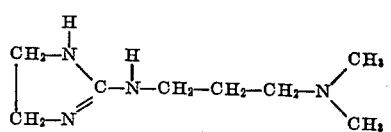

Similarly to the procedure of Example 3, 3-dimethylaminopropylamine was reacted with 2-nitroamino-Δ²-1,3-diazacyclopentene resulting in the formation of the compound 2-(3-dimethylaminopropylamino)-Δ²-1,3-diazacyclopentene.

EXAMPLE 16

*2-methoxybenzylamino-5-hydroxy-$\Delta^2$-tetrahydropyrimidine*

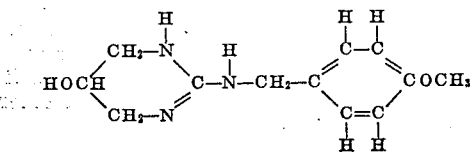

Similarly to the procedure of Example 12, 5-hydroxy-2-nitramino-$\Delta^2$-tetrahydropyrimidine was reacted with methoxybenzylamine resulting in the formation of the compound 2-methoxybenzyl-amino-5-hydroxy-$\Delta^2$-tetrahydropyrimidine.

We claim:

1. A process of preparing a 2-substituted amino-$\Delta^2$-1,3-diazacycloalkene comprising, reacting a 2-nitramino-$\Delta^2$-1,3-diazacycloalkene with an amine, having the formula R—NH$_2$ where R is a member of the group consisting of lower alkyl, monocyclic lower aralkyl, lower alkoxy-aralkyl and a radical having the formula

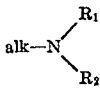

where R$_1$ stands for a member of the group consisting of hydrogen, alkyl and 1,3-diazacycloalkene radicals while R$_2$ stands for a member of the group consisting of hydrogen and alkyl radicals and alk represents an alkyl radical, under reaction conditions to replace the NO$_2$ group with the radical R, removing water substantially as formed while the reaction to form the desired 2-substituted amino-$\Delta^2$-1,3-diazacycloalkene takes place.

2. A process of preparing 2-aralkylamino-$\Delta^2$-1,3-diazacycloalkene comprising, reacting a 2-nitramino-$\Delta^2$-1,3-diazacycloalkene with an aralkylamine under reaction conditions to replace the NO$_2$ group with the aralkyl radical, removing water substantially as formed while the reaction to form the desired 2-aralkylamino-$\Delta^2$-1,3-diazacycloalkene takes place.

3. A 2-monocyclic aralkylamino-$\Delta^2$-1,3-diazacycloalkene.

4. A 2-substituted amino-$\Delta^2$-1,3-diazacycloalkene wherein the substituent is selected from the group consisting of lower alkyl, monocyclic lower aralkyl, lower alkoxy-aralkyl radicals and a radical having the formula

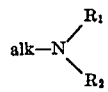

where R$^1$ stands for a member of the group consisting of hydrogen, lower alkyl and 1,3-diazacycloalkene radicals while R$_2$ stands for a member of the group consisting of hydrogen and lower alkyl radicals and alk represents an alkyl radical.

ARTHUR F. McKAY.
GORDON A. GRANT.

REFERENCES CITED

The following references are of record in the file of this patent:

UNITED STATES PATENTS

| Number | Name | Date |
| --- | --- | --- |
| 1,860,036 | Kranzlein et al. | May 24, 1932 |